(12) United States Patent
Knuth et al.

(10) Patent No.: US 11,253,124 B2
(45) Date of Patent: Feb. 22, 2022

(54) SAFETY MODULE FOR A FLOOR CLEANING UNIT

(71) Applicant: Diversey, Inc., Fort Mill, SC (US)

(72) Inventors: David M. Knuth, North Chesterfield, VA (US); Stephen D. Herr, Richmond, VA (US); Stephen J. Balas, Midlothan, VA (US); Angelo Sabatino, Muenchwilen (CH); Marcel Graf, Wilen (CH); Andre Baertsch, Rossrueti (CH); Sepp Stary, Balterswil (CH)

(73) Assignee: Diversey, Inc., Fort Mill, SC (US)

( * ) Notice: Subject to any disclaimer, the term of this patent is extended or adjusted under 35 U.S.C. 154(b) by 348 days.

(21) Appl. No.: 16/491,761

(22) PCT Filed: Mar. 9, 2018

(86) PCT No.: PCT/US2018/021669
§ 371 (c)(1),
(2) Date: Sep. 6, 2019

(87) PCT Pub. No.: WO2018/165508
PCT Pub. Date: Sep. 13, 2018

(65) Prior Publication Data
US 2021/0137339 A1 May 13, 2021

Related U.S. Application Data

(60) Provisional application No. 62/469,580, filed on Mar. 10, 2017.

(51) Int. Cl.
*A47L 9/28* (2006.01)
*A47L 11/40* (2006.01)
(Continued)

(52) U.S. Cl.
CPC .......... *A47L 9/2889* (2013.01); *A47L 9/2852* (2013.01); *A47L 11/4011* (2013.01);
(Continued)

(58) Field of Classification Search
CPC .. A47L 9/2889; A47L 9/2852; A47L 11/4011; A47L 2201/04; A47L 2201/00;
(Continued)

(56) References Cited

U.S. PATENT DOCUMENTS 4,675,935 A * 6/1987 Kasper ................ A47L 11/4011
15/319
4,839,936 A * 6/1989 Prange .................... E03F 9/005
15/104.33
(Continued)

FOREIGN PATENT DOCUMENTS

CN 203000786 U 6/2013
DE 102011004319 A 8/2012
(Continued)

OTHER PUBLICATIONS

International Search Report and Written Opinion of Application No. PCT/US2018/021669 dated Jul. 9, 2018; 2 pages.
(Continued)

*Primary Examiner* — Bhavesh V Amin
(74) *Attorney, Agent, or Firm* — Andrew R. Aranda (57) ABSTRACT

A cleaning unit for cleaning floors comprising a drivetrain, a main controller, a safety module, and one or more cleaning aggregates for cleaning a floor upon which the cleaning unit moves. The main controller may operate the cleaning unit in one of an autonomous mode in which cleaning unit autonomously navigates while cleaning the floor or a manual mode in which the cleaning unit is maneuverable under an applied external force while cleaning the floor. The safety module may be responsive to a plurality of safety inputs such that if
(Continued)

a safety input indicates an unsafe condition, the safety module initiates a lockout to stop movement by the cleaning unit. In the autonomous mode, the safety module may be responsive to a first set of safety inputs and in the manual operating mode, the safety module may be responsive to a second set of safety inputs.

23 Claims, 6 Drawing Sheets

(51) Int. Cl.
    *G05D 1/00* (2006.01)
    *G05D 1/02* (2020.01)

(52) U.S. Cl.
    CPC ......... *G05D 1/0061* (2013.01); *G05D 1/0214* (2013.01); *A47L 2201/04* (2013.01); *G05D 2201/0203* (2013.01)

(58) Field of Classification Search
    CPC ........ A47L 2201/06; A47L 9/00; A47L 11/40; G05D 1/0061; G05D 1/0214; G05D 2201/0203; G05D 1/0055
    See application file for complete search history.

(56) References Cited

U.S. PATENT DOCUMENTS

| | | | | |
|---|---|---|---|---|
| 4,893,375 | A * | 1/1990 | Girman | A47L 11/30 15/320 |
| 5,279,672 | A * | 1/1994 | Betker | A47L 11/4011 134/18 |
| 6,124,694 | A * | 9/2000 | Bancroft | G05D 1/0255 318/587 |
| 6,667,592 | B2 * | 12/2003 | Jacobs | G05D 1/0225 318/568.12 |
| 6,841,963 | B2 * | 1/2005 | Song | A47L 9/2852 318/568.12 |
| 7,761,954 | B2 * | 7/2010 | Ziegler | A47L 11/4066 15/320 |
| 8,532,860 | B2 * | 9/2013 | Daly | G05D 1/0289 701/23 |
| 9,028,617 | B2 * | 5/2015 | Balas | B08B 3/00 134/21 |
| 2004/0088076 | A1 * | 5/2004 | Gardner, Jr. | A47L 15/0063 700/239 |
| 2006/0089767 | A1 * | 4/2006 | Sowa | G01M 15/05 701/31.4 |
| 2008/0256741 | A1 * | 10/2008 | Garcia | B08B 5/04 15/319 |
| 2009/0072990 | A1 * | 3/2009 | Iida | G05B 23/0267 340/691.5 |
| 2010/0117585 | A1 * | 5/2010 | Fitch | B25J 19/06 318/568.12 |
| 2010/0117836 | A1 * | 5/2010 | Seyed Momen | G01S 1/7034 340/573.1 |
| 2011/0193704 | A1 * | 8/2011 | Harper | A61B 5/14 340/573.1 |
| 2011/0202175 | A1 * | 8/2011 | Romanov | B25J 5/00 700/250 |
| 2012/0318299 | A1 * | 12/2012 | Bigott | A47L 15/08 134/18 |
| 2014/0188325 | A1 * | 7/2014 | Johnson | G05D 1/0027 701/26 |
| 2015/0135476 | A1 * | 5/2015 | Eaglestone | A47L 9/08 15/379 |
| 2015/0234385 | A1 * | 8/2015 | Sandin | G05D 1/0265 700/258 |
| 2016/0147243 | A1 * | 5/2016 | Micali | G06F 16/9024 700/295 |
| 2018/0314255 | A1 * | 11/2018 | Nistler | G07C 5/0808 |
| 2020/0035098 | A1 * | 1/2020 | Vozar | B60W 50/029 |
| 2020/0057441 | A1 * | 2/2020 | Wang | B60W 60/0053 |
| 2021/0137339 | A1 * | 5/2021 | Knuth | A47L 11/4011 |

FOREIGN PATENT DOCUMENTS

| | | |
|---|---|---|
| JP | 2006271807 A | 10/2006 |
| WO | 2005/081074 A1 | 9/2005 |
| WO | 2006/046044 A1 | 5/2006 |

OTHER PUBLICATIONS

Khalid et al., Smart Floor Cleaning Robot (CLEAR); 2015; 7 pages.
POWERbot VR9000 Robot Vacuum Cleaner—cleaning modes brochure; 2015, 2 pages.
Dai et al., Design on Measurement and Control System of Cleaning Robot Based on Sensor Array Detection; abstract; 2007; IEEE International Conference on Control and Automation; 1 page.

* cited by examiner

SAFETY MODULE FOR A FLOOR CLEANING UNIT

BACKGROUND OF THE INVENTION

Embodiments disclosed herein relate to the technical field of floor cleaning units, and particularly automated floor cleaners. Conventional automated self-propelled cleaning robots offer many advantages over human-operated machines, such as lower ongoing operating costs and the ability to clean large floor surfaces with minimal human interaction. Examples of existing automation systems for self-propelled cleaning robots are disclosed in commonly assigned U.S. Pat. Nos. 9,028,617, 8,532,860, 6,667,592, and 6,124,694, the contents of which are expressly incorporated by reference herein.

Unfortunately, self-propelled cleaning robots may create a slightly elevated risk of damage to the robot or surrounding obstacles in the event the robot inadvertently collides or makes contact with surrounding obstacles. In some instances, automated, self-propelled cleaning robots can be maneuvered by an operator to move the machine to new locations or for spot cleaning tasks. However, even when these machines are manually operated, the risks posed by these machines do not disappear entirely. Therefore, it is desirable to improve or add safety measures to existing automated self-propelled cleaning robots.

SUMMARY OF THE INVENTION

In one embodiment, a cleaning unit for cleaning floors comprises a chassis comprising a drive motor, one or more drive wheels, and one or more cleaning aggregates for cleaning a floor upon which the cleaning unit moves. The cleaning unit may further comprise a main controller and a safety module, the main controller adapted to operate the cleaning unit in one of (a) an autonomous mode in which the 30 drive motor causes the one or more drive wheels to navigate the cleaning unit in a direction of travel while the one or more cleaning aggregates cleans the floor or (b) a manual mode in which the cleaning unit is maneuverable under an applied external force while the one or more cleaning aggregates cleans the floor. The safety module that may be responsive to a plurality of safety inputs such that if a safety input indicates an unsafe condition, the safety module initiates a lockout to stop movement by the cleaning unit. In the autonomous mode, the safety module may be responsive to a first subset of safety inputs that is smaller than the plurality of safety inputs and wherein in the manual operating mode, the safety module may be responsive to a second, different subset of safety inputs that is smaller than the plurality of safety inputs.

In one embodiment, the second subset of safety inputs is smaller than the first subset of safety inputs. In one embodiment, the cleaning unit further comprises a touch sensor that indicates whether the cleaning unit comes into contact with an external object other than the floor, the touch sensor being one of the first subset of safety inputs but not one of the second subset of safety inputs. In one embodiment, the safety module initiates a lockout to stop movement by the cleaning unit if a safety input indicates an unsafe condition persists longer than a predetermined period of time. In one embodiment, the cleaning unit further comprises a floor sensor that indicates the presence or absence of the floor, the floor sensor being one of the first subset of safety inputs but not one of the second subset of safety inputs.

In one embodiment, the cleaning unit further comprises a shell, a shell tilt mechanism, and a shell tilt mechanism switch. The shell may be exterior to and at least partly covering the chassis, the main controller, and the sensor module. The shell tilt mechanism may couple the shell and the chassis and comprises a lever that is displaceable between a first position in which the shell is constrained against movement with respect to the chassis and a second position in which the shell is not constrained against movement with respect to the chassis. When not constrained, the shell may be moveable between at least a first operating position relative to the chassis and a second transport position relative to the chassis. The shell tilt mechanism switch may provide a safety input to the safety module indicating whether the shell is in the first operating position or the second transport position. The shell tilt mechanism switch may be one of the first subset of safety inputs but not one of the second subset of safety inputs.

In one embodiment, the cleaning unit may further comprise a manual operating switch that determines whether the cleaning unit is safe to operate in the manual mode, the manual operating switch being one of the second subset of safety inputs. The manual operating switch may be an enabling switch that must remain engaged for the cleaning unit to operate in manual mode.

In one embodiment, the cleaning unit may further comprise a speed sensor indicating a speed at which the cleaning unit is traveling, the speed sensor being one of the first and second subsets of safety inputs. The safety module may initiate a lockout to stop movement by the cleaning unit when the speed of the cleaning unit exceeds a first maximum speed in autonomous mode. The safety module may initiate a lockout to stop movement by the cleaning unit when the speed of the cleaning unit exceeds a second maximum speed in manual mode. The second maximum speed may be greater than the first maximum speed.

In one embodiment, a method of operating a cleaning unit for cleaning floors may comprise providing a main controller that is configured to operate the cleaning unit in one of (a) an autonomous mode in which the main controller receives a plurality of navigation inputs and, responsive to the navigation inputs, the main controller commanding a drive motor to propel one or more drive wheels and navigating the cleaning unit in a direction of travel while cleaning the floor with one or more cleaning aggregates or (b) a manual mode in which the main controller is not responsive to the navigation inputs and permitting the cleaning unit to be maneuvered under an applied external force while the one or more cleaning aggregates cleans the floor. The method may further comprise receiving at a safety module a set of safety inputs, including at least a first, a second, and a third safety input, each of the set of safety inputs indicating a normal or unsafe condition. The method may also comprise the steps of detecting at the safety module an unsafe condition from the first safety input, and in response to the unsafe condition, the safety module initiating a lockout to stop all movement by the cleaning unit in either of the autonomous mode or the manual mode, and detecting at the safety module an unsafe condition from the second safety input, and in response to the unsafe condition, the safety module initiating a lockout to stop all movement by the cleaning unit in the autonomous mode but not initiating a lockout to stop all movement by the cleaning unit the manual mode, and detecting at the safety module an unsafe condition from the third safety input, and in response to the unsafe condition, the safety module not initiating a lockout to stop all movement by the cleaning unit in the autonomous mode but initiating a lockout to stop all movement by the cleaning unit the manual mode. The first safety input may be selected from the group comprising an emergency stop signal that allows an operator to immediately stop the cleaning unit, a speed sensor indicating a traveling speed for the cleaning unit, and a door position sensor indicating an open or closed state of an exterior door of the cleaning unit. The second safety input may be selected from the group comprising an outer shell tilt mechanism switch indicating whether an exterior shell cover of the cleaning unit is in a first operating position or a second transport position, a floor sensor indicating the presence or absence of the floor, and a touch sensor indicating whether the cleaning unit has come into contact with an external object other than the floor. The third safety input may be a manual operating switch indicating whether the cleaning unit is safe to operate in the manual mode.

In one embodiment, a cleaning unit for cleaning floors may comprise a chassis, a main controller, and a safety module, the chassis comprising a drive motor, one or more drive wheels, and one or more cleaning aggregates for cleaning a floor upon which the cleaning unit moves. The main controller may be adapted to operate the cleaning unit in one of (a) an autonomous mode in which the drive motor causes the one or more drive wheels to navigate the cleaning unit in a direction of travel while the one or more cleaning aggregates cleans the floor or (b) a manual mode in which the cleaning unit is maneuverable under an applied external force while the one or more cleaning aggregates cleans the floor. The safety module may be responsive to a plurality of safety inputs, each safety input indicating a normal condition or an unsafe condition, the safety module initiating a lockout to stop movement by the cleaning unit upon detecting an unsafe condition from one of the safety inputs. In the autonomous mode, the safety module may be responsive to a first set of safety inputs and wherein in the manual operating mode, the safety module may be responsive to a second set of safety inputs that is smaller than the first set safety inputs.

DETAILED DESCRIPTION OF THE INVENTION

Figure 1:
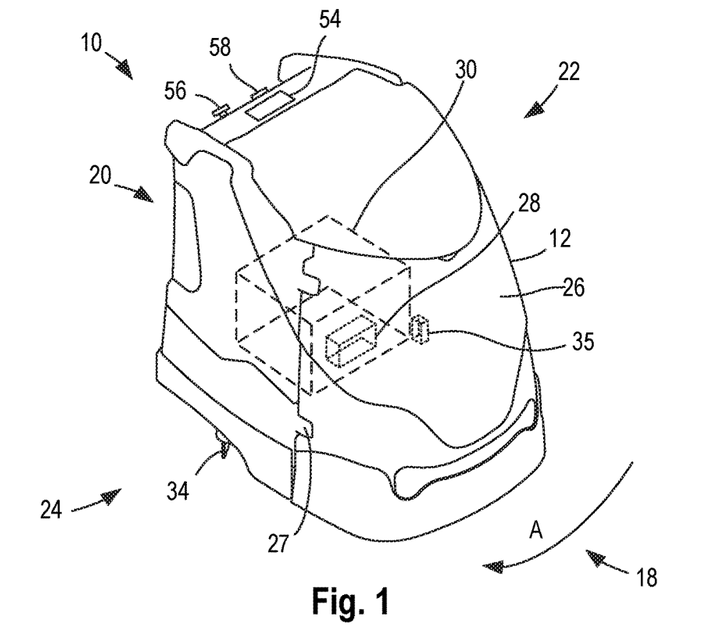
FIG. 1 is a perspective view of an exemplary cleaning unit according to one or more embodiments.

Referring now to embodiments of the invention in more detail, FIG. 1 shows an exemplary cleaning unit 10 that is mostly covered by a lightweight shell 12 and maneuvers on a set of wheels, including drive wheels 14 to propel the cleaning unit 10 and caster wheels 16, which permit turning about very small radii. The cleaning unit 10 includes a front portion 18, a rear portion 20, a left side 22 and right side 24 (from the perspective of an operator walking behind a forward traveling cleaning unit 10.

At the front portion 18, a front cover 26 can be opened about hinges 27 as indicated by the arrow A to expose the inner components of the cleaning unit 10. In FIG. 1, the front cover 26 is illustrated in a closed position and an interior electronics unit 28, rolling chassis 30, and tilt mechanism 35 are depicted simply as dashed boxes, but aspects of each are described and illustrated in greater detail elsewhere. The cleaning unit 10 includes one or more cleaning aggregates for cleaning a floor upon which the cleaning unit 10 moves. Indifferent embodiments, a cleaning unit 10 may include one or more scrubbers, brushes, nozzles, vacuums and/or the like. For example, one or more rotating brushes 32 and squeegee 34 are disposed at the bottom of cleaning unit 10. Embodiments of a brush 32 and squeegee 34 are more clearly visible in FIGS. 7A and 7B. Liquids, such as used cleaning solution or spills standing on the floor, may be vacuumed or otherwise suctioned into the cleaning unit 10 through the squeegee 34. The liquid collected by the squeegee 34 may be recycled by a liquid recycling system as shown and described in U.S. Pat. No. 9,028,617. The illustrated cleaning unit 10 also includes a top cover 36 that can be opened to expose a solution tank (not shown) for filling and storing cleaning solution. Cleaning solution may be a liquid, such as water, a chemical solution, a combination of water and one or more chemical solutions and/or the like for cleaning floor surfaces.

The chassis 30 may include a variety of mechanical components such as a drivetrain, motors, valves, and actuators (none specifically shown) for navigating the cleaning unit 10 or altering or adjusting the position or operation of one or more cleaning components (e.g., vacuums, squeegee 34, and/or brushes 32). The cleaning unit 10 may navigate autonomously with feedback from a number of sensors. Different sensor types may be used, including for example SONAR, LIDAR, cameras, gyroscopes, electromagnetic, thermal, contact, photosensitive, and the like. The electronics unit 28 may house a number of components that control the operation of the cleaning unit 10, such as a main controller 38, IO board, and drive amplifiers (not specifically shown). Beyond the basic navigation and operation of the cleaning unit 10, the electronics unit 28 may also implement a dedicated safety module 40, separate from the main controller 38, that is responsible for ensuring safe operation of the cleaning unit 10.

Figure 2:
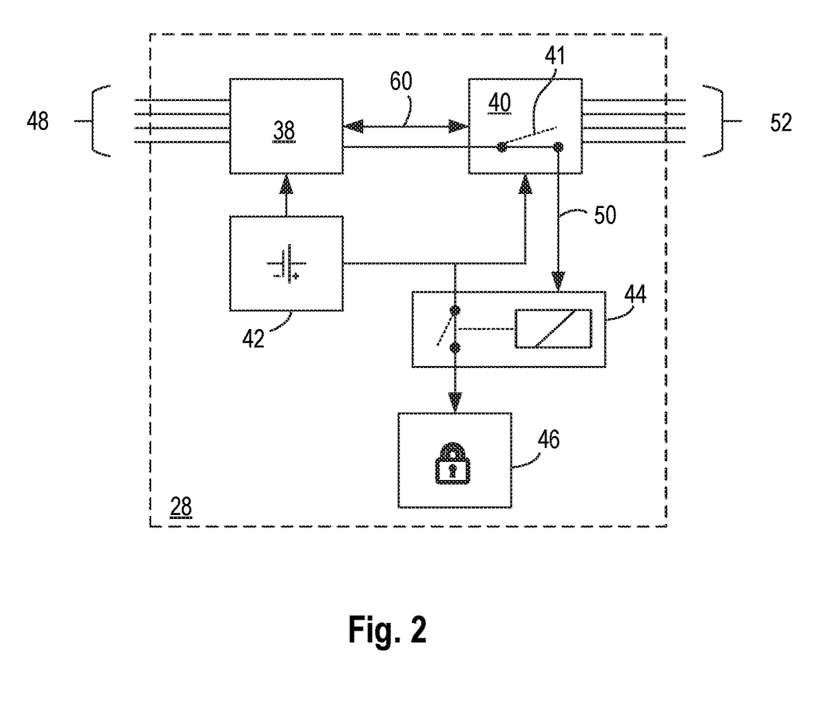
FIG. 2 is a simplified schematic representation of an electronics unit, a main controller, safety module, and lockout module according to one or more embodiments.

FIG. 2 shows a high level schematic illustrating the function of the safety module 40 in relation to the main controller 38. The five main components of the electronics unit 28 depicted in the embodiment of FIG. 2 include the main controller 38, safety module 40, power supply 42, power relay 44, and lockout module 46. As described above, the electronics 28 may include other components not essential for describing the safety module 40. In the illustrated embodiment, the power supply 42 provides operating power to each of the main controller 38 and safety module 40. The main controller 38 manages navigating and operating function for the cleaning unit 10 based, in part, on a number of different navigation and operation inputs 48, which may include information such as sensor inputs, wheel encoders, operator inputs, and location or POSE information such as from an optional mapping or navigation module.

In one or more embodiments, the sensor module 40 has the absolute ability to override the main controller 38 and cause the cleaning unit 10 to stop movement and/or cleaning. Meanwhile, the main controller 38 and a user interface panel 54 (FIG. 1) can remain active and responsive to inputs from an operator so that the fault or unsafe condition can be corrected to permit further cleaning. In the simplified schematic of FIG. 2, the sensor module 40 selectably manages the control of a power relay 44 with a low-power emergency stop signal 50 that selectably provides power to a lockout module 46. FIG. 2 depicts, at least schematically by a switch 41 within safety module 40, that the emergency stop signal 50, which previously might have been managed by the main controller 38, is now actively turned on or off by the safety module 40. The safety module 40 is able to detect a fault or unsafe condition based, in part, on a number of different safety inputs 52. The safety inputs 52 may include operating or state conditions from a number of sources, including for example wheel speed, proximity sensors, touch sensors, manual operator switches, and the like. In the event of a fault or unsafe condition, the sensor module 40 can cause the power relay 44 and lockout module 46 to stop the cleaning unit 10 to prevent damage or injury. Stopping the cleaning unit 10 in this context may include ceasing all movement of the cleaning aggregates and/or ceasing the movement of the wheels 14, 16, and the cleaning unit 10 itself.

The lockout module 46 may be implemented in a number of different ways, including for example with mechanical or electrical systems. In one embodiment, the lockout module 46 is implemented as a mechanical brake (not shown) on wheels, motors or rotary actuators. During normal operation, power delivered to a mechanical brake releases the brake and permits rotation of wheels, motors or rotary actuators. However, if the safety module 40 detects a fault or unsafe condition, the safety module 40 can cut the power relay 44 activation voltage/current, thus closing the power relay 44 switch and causing the mechanical brakes to engage. In other embodiments, the lockout module 46 can be implemented electronically or in software. For example, the lockout module 46 may provide a communication pathway that allows the main controller 38 to issue navigation and operation commands to the wheels, motors or rotary actuators. If the safety module 40 detects a fault or unsafe condition, the lockout module 46 may terminate or prevent communications from the main controller 38 to the wheels, motors or rotary actuators, thus causing the cleaning unit 10 to stop cleaning and/or moving.

The dedicated safety module 40 offers certain advantages over prior software-based safety routines that are executed by the main controller 38. As a stand-alone component, the safety module 40 can be device agnostic and implemented on different products without changing software for each instance. As a hardware or logic based component, the safety module 40 also may be more reliable and can be traced (e.g., for product compliance with safety standards). In one embodiment, the safety module 40 may be implemented as an electronic circuit using discrete logic components. In other embodiments, the safety module 40 may be implemented as a logic circuit, a digital circuit, a programmable chip, FPGA, ASIC, programmable logic device, programmable logic controller, and the like using conventional logic design theory including, for example combinational, sequential, synchronous, asynchronous, or register transfer systems.

Referring again to FIG. 1, the illustrated embodiment of cleaning unit 10 includes a user interface panel 54, an emergency stop switch 56, and a manual operating switch 58. The user interface panel 54 allows an operator to enter certain information into or to access certain information about the cleaning unit 10. For example, an operator may enter a passcode or user ID to access menus, cleaning history, battery information, diagnostics, and the like. The user interface panel 54 may comprise buttons, switches, dials, LEDs, lamps, LCD screens, biometric readers, or touchscreen displays, for example. The emergency stop switch 56 is a user actuated kill switch that allows an operator to immediately stop the cleaning unit 10 in the event of an emergency, fault, or unsafe condition. The manual operating switch 58 is a user actuated switch that is engaged by an operator while using the cleaning unit 10 in a manual mode. In one embodiment, the manual operating switch 58 automatically causes the cleaning unit 10 to switch from an autonomous operating mode to a manual operating mode. In one embodiment, the manual operating switch 58 is an enabling switch, such as a lever, push button, or trigger, that must remain engaged by the operator in order to use the cleaning unit 10 in manual mode. In other embodiments, the manual operating switch 58 may be an operator presence switch in the form of a wire attaching the cleaning unit 10 to the operator, e.g., with a wrist band. Alternatively, the manual operating switch 58 may be implemented as a hardware or software based selector that allows the cleaning unit 10 to operate in the selected mode.

Figure 3A:
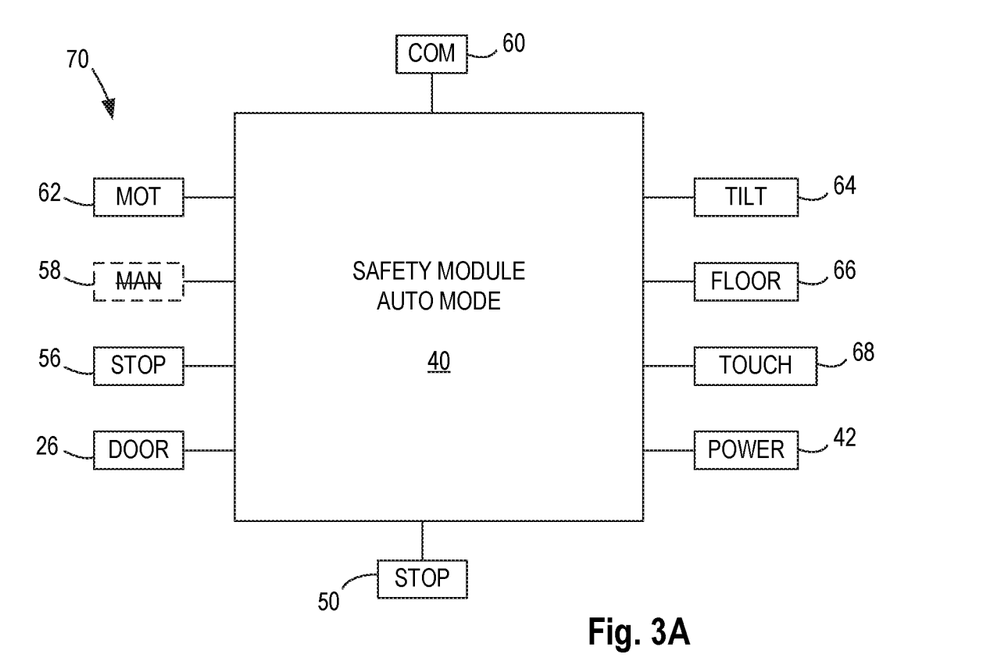
FIG. 3A is an Input-Output (IO) diagrams for a representative safety module operating in an autonomous operating mode according to one or more embodiments.
Figure 3B:
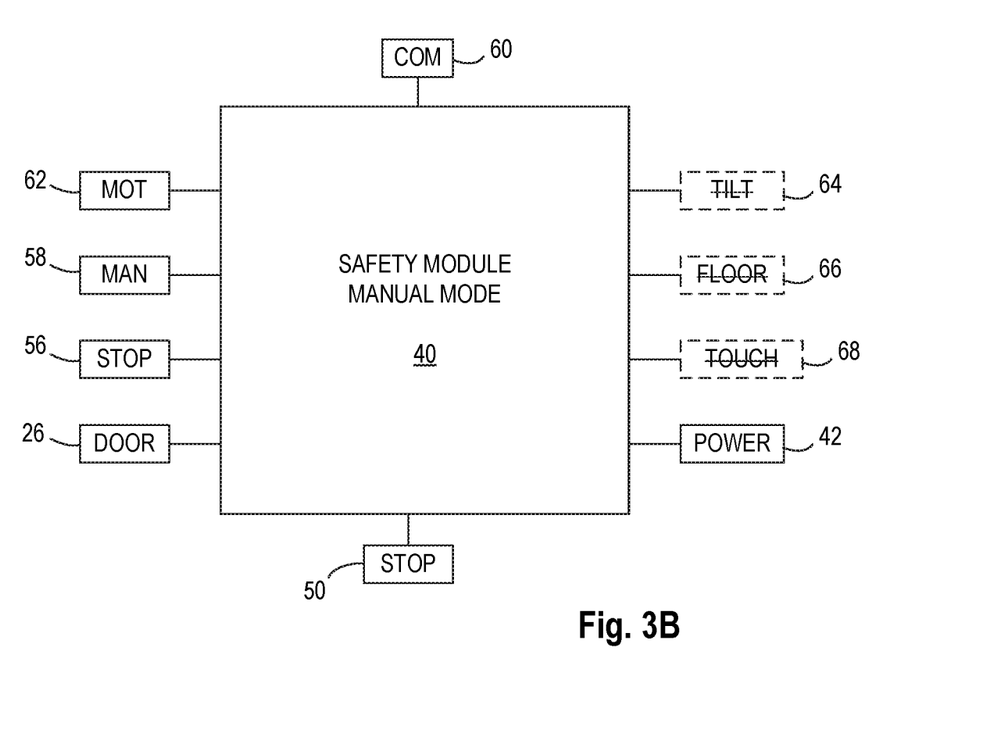
FIG. 3B is an Input-Output (IO) diagrams for a representative safety module operating in a manual operating mode according to one or more embodiments.

FIGS. 3A and 3B depict Input-Output (IO) diagrams for a representative safety module 40 in autonomous and manual operating modes, respectively. A communications link 60 is illustrated at the top of the IO diagram and allows information to pass between the main controller 38 and the safety module 40. In some embodiments, the safety module 40 may receive information from the main controller 38 about the operating mode, max operating speed, or other information relating to safe operation of the cleaning unit 10. Similarly, the main controller 38 may ping the safety module 40 for a readiness check to make sure the safety module 40 is operating as designed. The communications link 60 may comprise a serial bus interface or other communications bus. Some non-limiting examples include Serial Peripheral Interface, RS-232, I2C, Can-Bus, and the like. The emergency stop signal 50 is shown at the bottom of the IO diagrams and represents the master control signal that activates the lockout module 46 and is capable of causing the cleaning unit 10 to stop cleaning and/or moving as described above. Also, the power supply 42 input to the safety module 40 is shown at the lower right of each IO diagram.

The other inputs to the IO diagrams represent example safety inputs 52 monitored by the safety module 40 to ensure safe operation of the cleaning unit 10. In the illustrated embodiment, seven safety inputs 52 are shown, though more or fewer inputs are certainly contemplated. The exemplary safety inputs 52 comprise: drive wheel motor speed 62, manual operating switch 58 engagement, emergency stop switch 56 engagement, front door 26 position, tilt mechanism switch 64 position, floor presence sensor 66 and touch sensor 68. The drive wheel motor speed 62 may be provided by one or more motor encoders to indicate the rotational speed of the drive wheels 14. The drive wheel motor speed 62 is depicted as a single safety input 52, but additional inputs may be appropriate to indicate speed for each of a plurality of drive wheels 14, caster wheels 16, or both. In one embodiment, the safety module 40 enforces a common max speed limit (VMAX) in each of the autonomous and manual operating modes. In one embodiment, the safety module 40 enforces a first max speed limit (VMAX1) in autonomous mode and a second max speed limit (VMAX2) in manual mode. In one embodiment, the second max speed limit (VMAX2) is greater than the first max speed limit (VMAX1). In one embodiment, the second max speed limit (VMAX2) is about three times larger than the first max speed limit (VMAX1). For example, VMAX2 may be about 1.0-1.5 meters per second and VMAX1 may be about 0.3-0.5 meters per second. In one embodiment, the second max speed limit (VMAX2) is less than the first max speed limit (VMAX1).

The front door 26 position input provides an indication of the opened or closed state of the front door 26. Since some sensors may be located in the front door 26, inaccurate position and object feedback may be reported if the front door 26 is not properly closed and secured. Furthermore, an open front door 26 may introduce a shock hazard. Thus, the front door 26 should be closed prior to operation. The tilt mechanism switch 64 is shown in greater detail in FIGS. 6A and 6B and described in greater detail below, but the outer shell 12 of the cleaning unit 10 is selectably moveable between a normal operating position or a tilted transport position to facilitate movement of the cleaning unit 10, for example up and down ramped, curved, or tilted surfaces. An exemplary floor presence sensor 66 is illustrated in FIGS. 7A and 7B and may be implemented as one or more opto-electronic distance measuring sensors. The floor presence sensor 66 is depicted as a single safety input 52, but additional sensors and additional inputs may be appropriate for safety redundancy, and floor sensing in different travel directions and by different parts of the cleaning unit 10. A representative touch sensor 68 is shown integrated in or behind lower portions of the outer shell 12 as shown in FIGS. 1, 7A, and 7B. The touch sensor 68 provides feedback when the outer shell 12 of the cleaning unit contacts an external object, such as a wall or box. The touch sensor 68 may be implemented as a single two-position sensor to indicate "touch" or "no touch" conditions. Alternatively, the touch sensor 68 may provide some measurable magnitude of contact force, using for example piezoelectric type sensors. Alternatively, the touch sensor 68 may include multiple stages of sensors with a first stage indicating the presence of an initial, light contact force and a second stage indicating the presence of a larger contact force.

In the illustrated IO diagrams, one or more of the safety inputs 52 are deactivated, disabled, or ignored depending on the particular operating mode. That is, some first subset 70 of the safety inputs 52 less than the full set of safety inputs 52 are active in autonomous operating mode (FIG. 3A). Similarly, some second subset 72 of the safety inputs 52 less than the full set of safety inputs 52 are active in manual operating mode (FIG. 3B). For instance, when the cleaning unit 10 is operated in autonomous mode (FIG. 3A), it may not be necessary to monitor the manual operating switch 58 engagement because an operator is normally not present to engage the manual operating switch 58. In general, the cleaning unit 10 may operate without user intervention in autonomous mode. By comparison, when the cleaning unit 10 is operated in manual mode (embodiment in FIG. 3B), the safety module 40 verifies that the manual operating switch 58 is engaged before allowing the cleaning unit 10 to be maneuvered.

In at least one embodiment where the manual operating switch 58 automatically causes the cleaning unit 10 to switch from an autonomous operating mode to a manual operating mode, safety module 40 will actively monitor the state of the manual operating switch 58 in autonomous mode. Thus, in one alternative embodiment, the first subset 70 of the safety inputs 52 includes the full set of safety inputs 52 and all are active and monitored in autonomous operating mode.

In the present embodiment illustrated in FIGS. 3A & 3B, the first subset 70 of safety inputs 52 may comprise a drive wheel motor speed 62, emergency stop switch 56 engagement, front door 26 position, tilt mechanism switch 64 position, floor presence sensor 66 and touch sensor 68. Similarly, in the present embodiment, the second subset 72 of safety inputs 52 may comprise a drive wheel motor speed 62, manual operating switch 58 engagement, emergency stop switch 56 engagement, and front door 26 position. In one embodiment, second subset 72 of safety inputs 52 is smaller than the first subset 70 of safety inputs 52. In the present embodiment, the second subset 72 comprises four safety inputs 52 while the first subset 70 comprises six safety inputs.

In manual operating mode, it may be desirable to maneuver the cleaning unit 10 with the outer shell 12 placed in either a normal operating position or a tilted transport position. Thus, it may not be necessary to monitor the tilt mechanism switch 64 position in manual operating mode. Moreover, the floor presence sensor 66 and touch sensors 68 may trigger false safety alerts when the cleaning unit 10 is being pushed by an operator. For example, the floor presence sensor 66, which normally verifies the presence of a floor surface so the cleaning unit 10 does not fall over an edge or down a set of stairs, may trigger a false alert when an operator is attempting to push the cleaning unit 10 into an elevator car. The floor presence sensor 66 may interpret the gap between the floor and the car as an unsafe condition, thus causing the safety module 40 to stop the cleaning unit 10. Similarly, the touch sensor 68 may also trigger a false alert when an operator is attempting to intentionally push the cleaning unit 10 through a swinging door, for example. Thus, it may be desirable to inactivate certain safety inputs 52 when the cleaning unit 10 is being pushed by an operator in manual operating mode.

Figure 4:
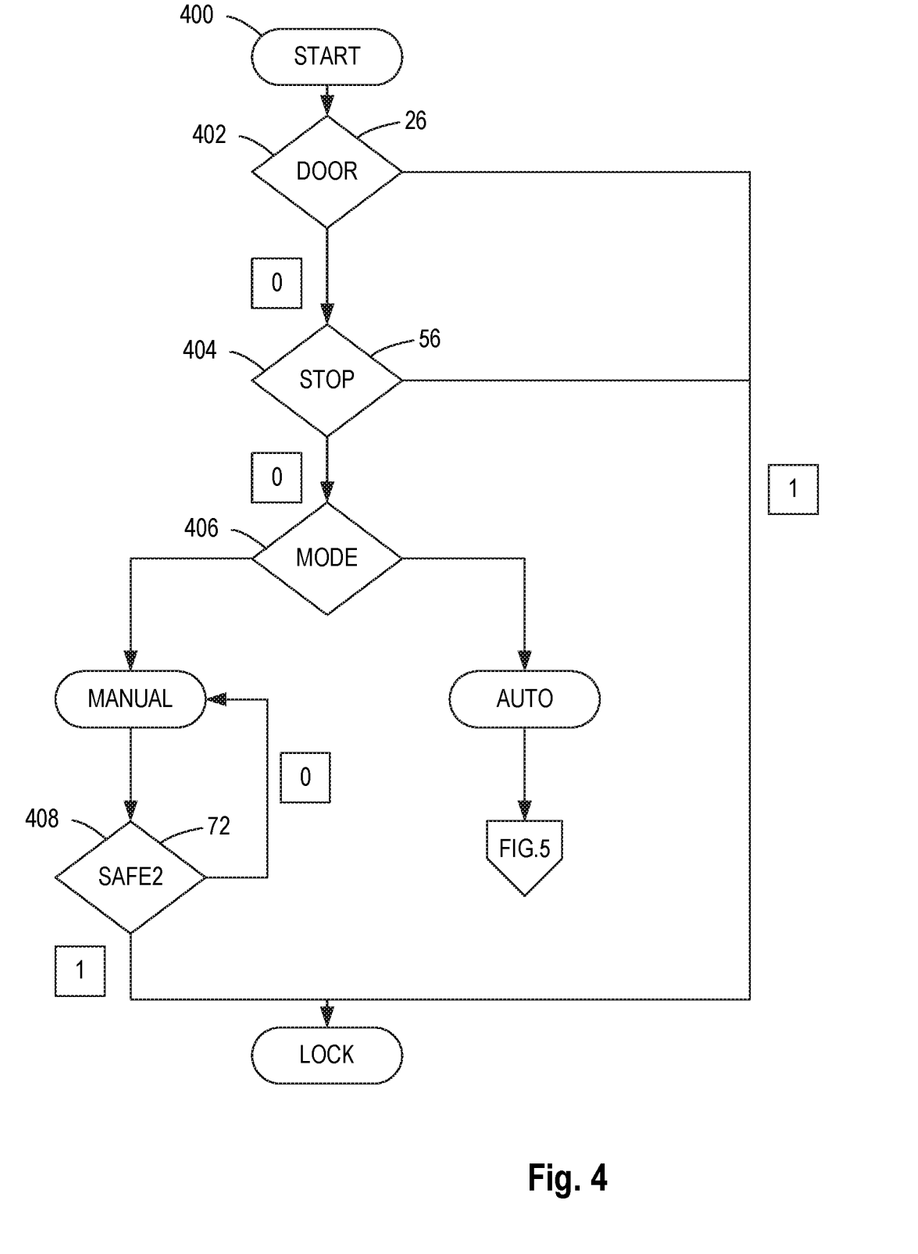
FIGS. 4&5 depict a flow diagram illustrating a logical decision tree that is enforced by a safety module according to one or more embodiments.
Figure 5:
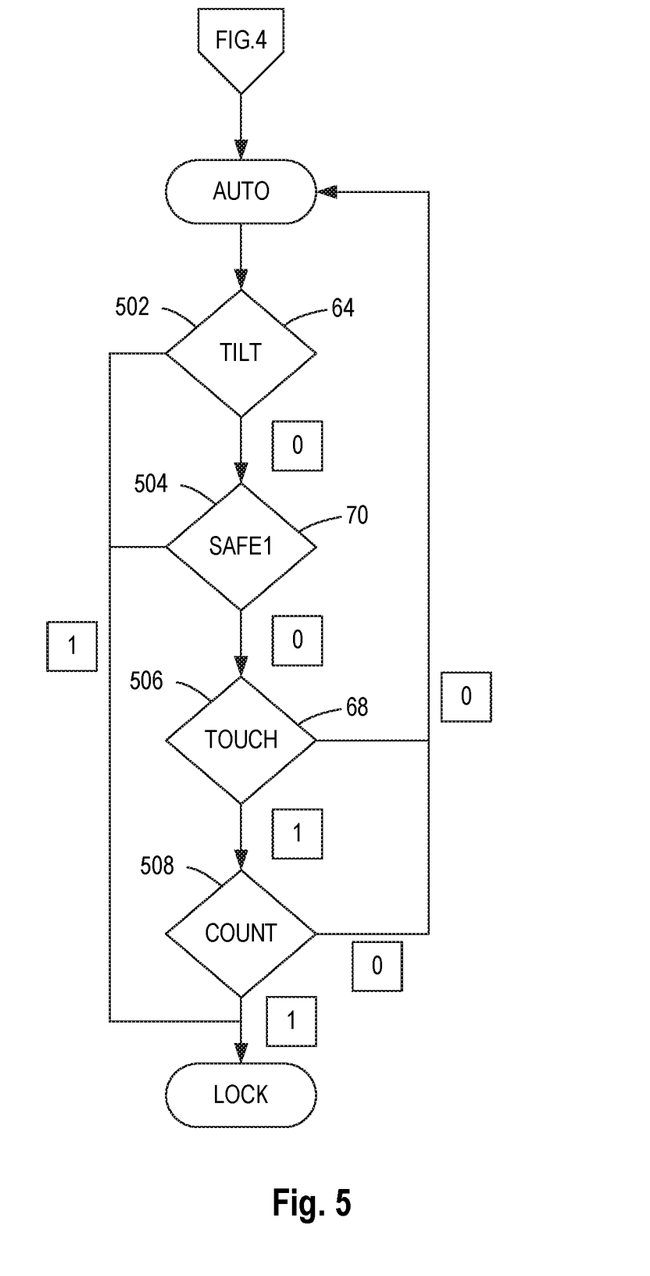

FIGS. 4 and 5 provide an exemplary flow diagram illustrating a logical decision tree that might be enforced by the safety module 40 during operation of the cleaning unit 10 in each of the manual and autonomous operating modes. While the logical decision tree illustrated in FIGS. 4 and 5 is presented and described as a process flow, those skilled in the art will appreciate that a logic or hardware based implementation may accomplish similar functionality in manner that is a less serial in nature. The process begins at step 400 and continues to checkpoint 402, where the open/closed state for the front cover 26 is determined. If the front cover 26 is open, indicated by a high bit (1), the safety module 40 causes the lockout module 46 to stop all movement and/or cleaning by the cleaning unit 10. If the front cover 26 is closed, indicated by a low bit (0), the process continues to checkpoint 404, where the emergency stop switch 56 engagement is determined. If the emergency stop switch 56 is engaged, indicated by a high bit (1), the safety module 40 causes the lockout module 46 to stop all movement and/or cleaning by the cleaning unit 10. If the emergency stop switch 56 is not engaged, indicated by a low bit (0), the process continues to checkpoint 406, where the operating mode (autonomous or manual) is determined. The autonomous operating mode decision tree continues in FIG. 5 and is described in detail blow.

The manual operating mode decision tree continues at checkpoint 408 where the remaining safety inputs 52 in the second subset 72 are monitored for a fault or unsafe condition. In one embodiment, the drive wheel motor speed 62 is verified to be below a maximum safe operating speed (VMAX or VMAX2) and manual operating switch 58 remains engaged. If the maximum safe operating speed is exceeded or the manual operating switch 58 becomes disengaged, indicated by a high bit (1), the safety module 40 causes the lockout module 46 to stop all movement and/or cleaning by the cleaning unit 10. However, if the maximum safe operating speed is not exceeded and the manual operating switch 58 remains engaged, indicated by a low bit (0), the process continues to operate in manual operating mode.

The autonomous operating mode decision tree continues in FIG. 5 at checkpoint 502, where the tilt mechanism switch 64 position is determined. If the tilt mechanism switch 64 indicates that the outer shell 12 is tilted into the transport position, indicated by a high bit (1), the safety module 40 causes the lockout module 46 to stop all movement and/or cleaning by the cleaning unit 10. If the tilt mechanism switch 64 indicates that the outer shell 12 is in a normal operating position, indicated by a low bit (0), the process continues to checkpoint 504, where additional safety inputs 52 in the first subset 70 are monitored for a fault or unsafe condition. In one embodiment, the drive wheel motor speed 62 is verified to be below a maximum safe operating speed (VMAX or VMAX1) and the floor presence sensor 66 verifies the presence of a floor surface. If the maximum safe operating speed is exceeded or the floor presence sensor 66 fails to detect a floor surface, indicated by a high bit (1), the safety module 40 causes the lockout module 46 to stop all movement and/or cleaning by the cleaning unit 10. However, if the maximum safe operating speed is not exceeded and the floor presence sensor 66 verifies the presence of a floor surface, indicated by a low bit (0), the process continues to checkpoint 506, where the state of the touch sensor 68 is checked. If the touch sensor 68 does not indicate that the outer shell 12 has come into contact with an external object, indicated at checkpoint 506 by a low bit (0), the process continues to operate in autonomous operating mode.

In some embodiments, a particular fault or unsafe condition is sensed and the safety module 40 immediately stops all movement and/or cleaning by the cleaning unit 10. In other embodiments, a short delay may be implemented to see if the fault or unsafe condition remedies itself. For instance, if the touch sensor 68 indicates that the outer shell 12 has come into contact with an external object, a short countdown timer may begin at checkpoint 508. If the countdown timer elapses while the touch sensor 68 continues to indicate that the outer shell 12 remains in contact with an external object, indicated by a high bit (1), the safety module 40 causes the lockout module 46 to stop all movement and/or cleaning by the cleaning unit 10. However, if within the countdown time, the touch sensor 68 no longer indicates that the outer shell 12 is in contact with an external object, indicated by a low bit (0), the process continues to operate in autonomous operating mode.

In the event of a stop condition, the main controller 38 and user interface panel 54 remain active so that an operator can check the status of the cleaning unit 10, maneuver the cleaning unit 10, or otherwise remove the unsafe condition to resume normal operations in either of the autonomous or manual operating modes.

Figure 6A:
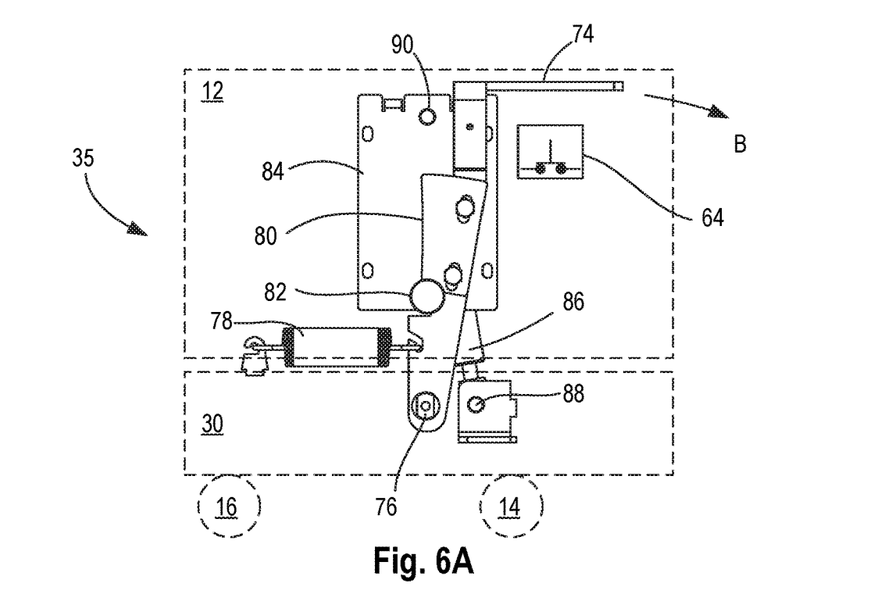
FIG. 6A is a lateral view of a tilt mechanism securing an outer shell of a cleaning unit in an operating position according to one or more embodiments.
Figure 6B:
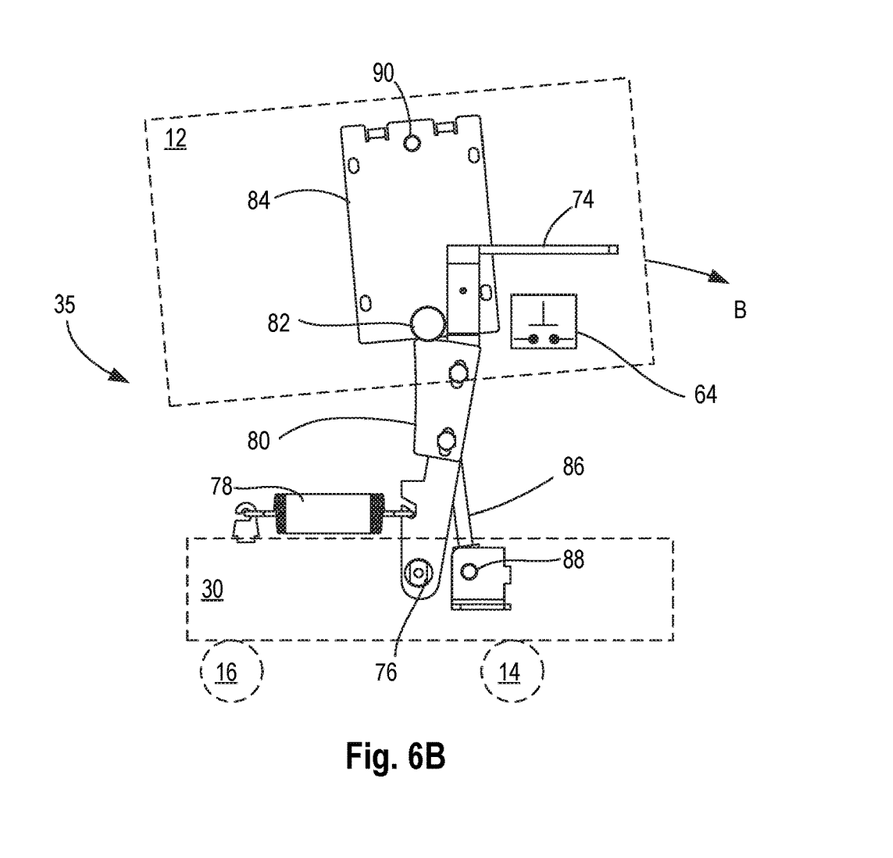
FIG. 6B is a lateral view of a tilt mechanism securing an outer shell of a cleaning unit in a transport position according to one or more embodiments.
Figure 7A:
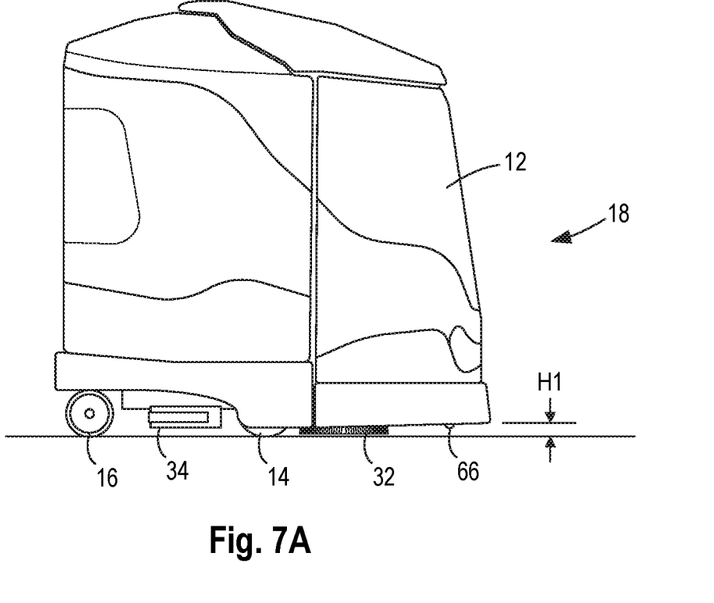
FIG. 7A is a lateral view of a cleaning unit with an outer shell of the cleaning unit disposed in an operating position according to one or more embodiments.
Figure 7B:
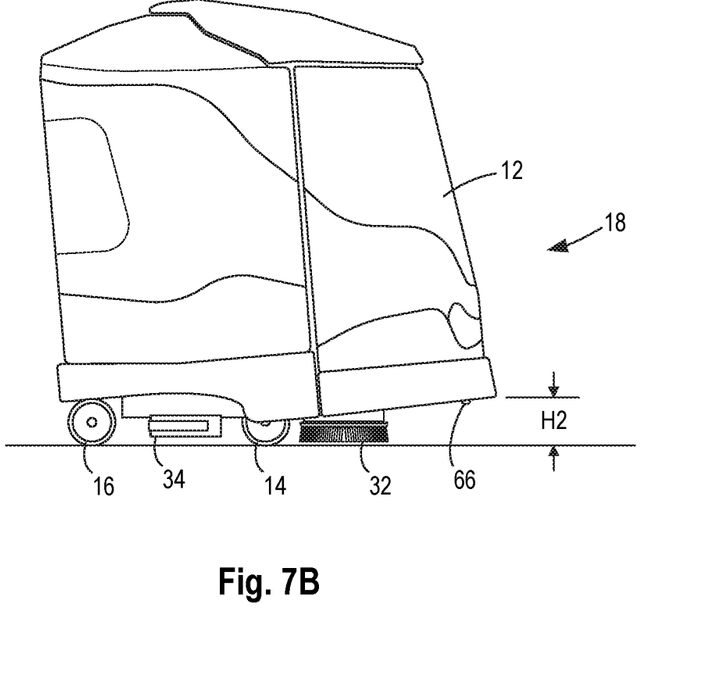
FIG. 7B is a lateral view of a cleaning unit with an outer shell of the cleaning unit disposed in a transport position according to one or more embodiments.

FIGS. 6A, 6B, 7A, and 7B illustrate the function and operation of one embodiment of a tilt mechanism 35, adapted to allow some or all of the outer shell 12 to move between a normal operating position or a tilted transport position to facilitate movement of the cleaning unit 10, for example up and down ramped, curved, or tilted surfaces. In FIGS. 6A and 6B, the exemplary tilt mechanism 35 is illustrated in solid lines while the chassis 30, wheels 14, 16, and outer shell 12 are depicted by simple dashed shapes for clarity. The illustrated tilt mechanism 35 includes a lever 74 that pivots about connecting bar 76 and is secured in place by a holder spring 78. In the illustrated embodiment, the connecting bar 76 and opposite end of the biasing element 78 are secured to the chassis 30 in a manner that allows the lever 74 to pivot outward as indicated by arrow B against the force provided by holder spring 78. An operator wishing to move the outer shell between the normal operating position shown in FIGS. 6A & 7A and the transport position shown in FIGS. 6B & 7B initiates the process by moving the lever 74 against the force of the holder spring 78 in the direction indicated by arrow B. Moving the lever 74 in the direction of arrow B disengages a holder plate 80, which is secured to the lever 74, from a protruding position stop 82, which is secured to a shell mounting plate 84. The holder plate 80 may be adjustably secured to the lever 74, such as with slots, to account for tolerance buildup between the chassis 30 and the shell 12. The position stop 82 and shell mounting plate 84 are secured to the shell 12 in a manner that they move with the shell 12 as it moves between the two positions.

The lifting action for the position stop 82, shell mounting plate 84, and shell 12 may be aided by a pneumatic spring 86 that is pivotably secured to the chassis 30 at a first pivot mount 88, and to the shell 12 at a second pivot mount 90. FIG. 6A shows the pneumatic spring 86 in a compressed, shortened state. Since the pneumatic spring 86 is filled with a gas to an internal pressure that exceeds atmospheric pressure, the unconstrained pneumatic spring 86 will extend to the extended state shown in FIG. 6B, thus assisting with lifting force to move the shell 12 to the transport position. When the lever 74 is pulled into its home position (in the direction opposite arrow B) shown in each of FIGS. 6A & 6B, the holder plate 80 blocks vertical movement of the position stop 82 and the shell 12. For example, in FIG. 6A, the holder plate 80 holds the position stop 82 down in the normal operating position against any force applied by the pneumatic spring 86. By comparison, in FIG. 6B, the holder plate 80 holds the position stop 82 up in the transport position against any weight of the shell and/or any liquids stored in the upper portion of the cleaning unit 10. To move the shell 12 between the two positions, the lever 74 is moved in the direction of arrow B so that the holder plate 80 clears the position stop 82, then the shell 12 can be lifted up or pushed down to the other vertical position. Once the position stop 82 clears the opposite end of the holder plate 80, the lever 74 is pulled back by the holder spring 78 to its home position as shown in FIGS. 6A & 6B. FIGS. 6A and 6B illustrate a single tilt mechanism 35, but multiple tilt mechanisms 35, disposed at each of the left 22 and right 24 sides of the cleaning unit 10 and coupled to the connecting bar 76 may cooperate to accomplish the same function.

FIGS. 7A & 7B respectively show the normal operating position and transport position for the shell 12. In FIG. 7A, the front portion 18 of shell 12 extends downward to a height H1 above the bottom of the wheels 14, 16. Height H1 is preferably small to prevent damage to nearby obstacles or persons that might occur if the cleaning unit 10 drives over an obstacle or, for example, the foot of a person. By comparison, the shell 12 may be tilted to the transport mode shown in FIG. 7B where the front portion 18 of shell 12 is lifted upward to a height H2, greater than height H1, above the bottom of the wheels 14, 16.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A cleaning unit for cleaning floors comprising:
   a chassis comprising a drive motor, one or more drive wheels, and one or more cleaning aggregates for cleaning a floor upon which the cleaning unit moves;
   a main controller adapted to operate the cleaning unit in one of (a) an autonomous mode in which the drive motor causes the one or more drive wheels to navigate the cleaning unit in a direction of travel while the one or more cleaning aggregates cleans the floor or (b) a manual mode in which the cleaning unit is maneuverable under an applied external force while the one or more cleaning aggregates cleans the floor;
   a safety module that is responsive to a plurality of safety inputs such that if a safety input indicates an unsafe condition, the safety module initiates a lockout to stop movement by the cleaning unit; and
   wherein in the autonomous mode, the safety module is responsive to a first subset of safety inputs that is smaller than the plurality of safety inputs and wherein in the manual operating mode, the safety module is responsive to a second, different subset of safety inputs that is smaller than the plurality of safety inputs.

2. The cleaning unit of claim 1, wherein the second subset of safety inputs is smaller than the first subset of safety inputs.

3. The cleaning unit of claim 1, the cleaning unit further comprising a touch sensor that indicates whether the cleaning unit comes into contact with an external object other than the floor, the touch sensor being one of the first subset of safety inputs but not one of the second subset of safety inputs.

4. The cleaning unit of claim 1 wherein the safety module initiates a lockout to stop movement by the cleaning unit if a safety input indicates an unsafe condition persists longer than a predetermined period of time.

5. The cleaning unit of claim 1, the cleaning unit further comprising a floor sensor that indicates the presence or absence of the floor, the floor sensor being one of the first subset of safety inputs but not one of the second subset of safety inputs.

6. The cleaning unit of claim 1, the cleaning unit further comprising:
   a shell, the shell being exterior to and at least partly covering the chassis, the main controller, and the sensor module;
   a shell tilt mechanism, the shell tilt mechanism coupling the shell and the chassis and comprising a lever that is displaceable between a first position in which the shell is constrained against movement with respect to the chassis and a second position in which the shell is not constrained against movement with respect to the chassis and is moveable between at least a first operating position relative to the chassis and a second transport position relative to the chassis; and
   a shell tilt mechanism switch that provides a safety input to the safety module indicating whether the shell is in the first operating position or the second transport position.

7. The cleaning unit of claim 6, wherein the shell tilt mechanism switch is one of the first subset of safety inputs but not one of the second subset of safety inputs.

8. The cleaning unit of claim 1, the cleaning unit further comprising a manual operating switch that determines whether the cleaning unit is safe to operate in the manual mode, the manual operating switch being one of the second subset of safety inputs.

9. The cleaning unit of claim 8, wherein the manual operating switch is an enabling switch that must remain engaged for the cleaning unit to operate in manual mode.

10. The cleaning unit of claim 1, the cleaning unit further comprising a speed sensor indicating a speed at which the cleaning unit is traveling, the speed sensor being one of the first and second subsets of safety inputs, the safety module initiating a lockout to stop movement by the cleaning unit when the speed of the cleaning unit exceeds a first maximum speed in autonomous mode and initiating a lockout to stop movement by the cleaning unit when the speed of the cleaning unit exceeds a second maximum speed in manual mode, the second maximum speed being greater than the first maximum speed.

11. A method of operating a cleaning unit for cleaning floors comprising:
   providing a main controller that is configured to operate the cleaning unit in one of:
      (a) an autonomous mode in which the main controller receives a plurality of navigation inputs and, responsive to the navigation inputs, the main controller commanding a drive motor to propel one or more drive wheels and navigating the cleaning unit in a direction of travel while cleaning the floor with one or more cleaning aggregates; or
      (b) a manual mode in which the main controller is not responsive to the navigation inputs and permitting the cleaning unit to be maneuvered under an applied external force while the one or more cleaning aggregates cleans the floor;
   receiving at a safety module a set of safety inputs, including at least a first, a second, and a third safety input, each of the set of safety inputs indicating a normal or unsafe condition;
   detecting at the safety module an unsafe condition from the first safety input, and in response to the unsafe condition, the safety module initiating a lockout to stop all movement by the cleaning unit in either of the autonomous mode or the manual mode;
   detecting at the safety module an unsafe condition from the second safety input, and in response to the unsafe condition, the safety module initiating a lockout to stop all movement by the cleaning unit in the autonomous mode but not initiating a lockout to stop all movement by the cleaning unit the manual mode; and
   detecting at the safety module an unsafe condition from the third safety input, and in response to the unsafe condition, the safety module not initiating a lockout to stop all movement by the cleaning unit in the autonomous mode but initiating a lockout to stop all movement by the cleaning unit the manual mode.

12. The method of claim 11, wherein the first safety input is selected from the group comprising an emergency stop signal that allows an operator to immediately stop the cleaning unit, a speed sensor indicating a traveling speed for the cleaning unit, and a door position sensor indicating an open or closed state of an exterior door of the cleaning unit.

13. The method of claim 11, wherein the second safety input is selected from the group comprising an outer shell tilt mechanism switch indicating whether an exterior shell cover of the cleaning unit is in a first operating position or a second transport position, a floor sensor indicating the presence or absence of the floor, and a touch sensor indicating whether the cleaning unit has come into contact with an external object other than the floor.

14. The method of claim 11, wherein the third safety input is a manual operating switch indicating whether the cleaning unit is safe to operate in the manual mode.

15. A cleaning unit for cleaning floors comprising:
   a chassis comprising a drive motor, one or more drive wheels, and one or more cleaning aggregates for cleaning a floor upon which the cleaning unit moves;
   a main controller adapted to operate the cleaning unit in one of (a) an autonomous mode in which the drive motor causes the one or more drive wheels to navigate the cleaning unit in a direction of travel while the one or more cleaning aggregates cleans the floor or (b) a manual mode in which the cleaning unit is maneuverable under an applied external force while the one or more cleaning aggregates cleans the floor;
   a safety module that is responsive to a plurality of safety inputs, each safety input indicating a normal condition or an unsafe condition, the safety module initiating a lockout to stop movement by the cleaning unit upon detecting an unsafe condition from one of the safety inputs; and
   wherein in the autonomous mode, the safety module is responsive to a first set of safety inputs and wherein in the manual operating mode, the safety module is responsive to a second set of safety inputs that is smaller than the first set safety inputs.

16. The cleaning unit of claim 15, the cleaning unit further comprising a touch sensor that indicates whether the cleaning unit comes into contact with an external object other than the floor, the touch sensor being one of the first subset of safety inputs but not one of the second subset of safety inputs.

17. The cleaning unit of claim 15 wherein the safety module initiates a lockout to stop movement by the cleaning unit if a safety input indicates that an unsafe condition persists longer than a predetermined period of time.

18. The cleaning unit of claim 15, the cleaning unit further comprising a floor sensor that indicates the presence or absence of the floor, the floor sensor being one of the first subset of safety inputs but not one of the second subset of safety inputs.

19. The cleaning unit of claim 15, the cleaning unit further comprising:
   a shell, the shell being exterior to and at least partly covering the chassis, the main controller, and the sensor module;
   a shell tilt mechanism, the shell tilt mechanism coupling the shell and the chassis and comprising a lever that is displaceable between a first position in which the shell is constrained against movement with respect to the chassis and a second position in which the shell is not constrained against movement with respect to the chassis and is moveable between at least a first operating position relative to the chassis and a second transport position relative to the chassis; and
   a shell tilt mechanism switch that provides a safety input to the safety module indicating whether the shell is in the first operating position or the second transport position.

20. The cleaning unit of claim 19, wherein the shell tilt mechanism switch is one of the first subset of safety inputs but not one of the second subset of safety inputs.

21. The cleaning unit of claim 15, the cleaning unit further comprising a manual operating switch that determines whether the cleaning unit is safe to operate in the manual mode, the manual operating switch being one of the second subset of safety inputs.

22. The cleaning unit of claim 21, wherein the manual operating switch is an enabling switch that must remain engaged for the cleaning unit to operate in manual mode.

23. The cleaning unit of claim 15, the cleaning unit further comprising a speed sensor indicating a speed at which the cleaning unit is traveling, the speed sensor being one of the first and second subsets of safety inputs, the safety module initiating a lockout to stop movement by the cleaning unit when the speed of the cleaning unit exceeds a first maximum speed in autonomous mode and initiating a lockout to stop movement by the cleaning unit when the speed of the cleaning unit exceeds a second maximum speed in manual mode, the second maximum speed being greater than the first maximum speed.

* * * * *